United States Patent [19]

Verdier

[11] Patent Number: 5,283,812
[45] Date of Patent: Feb. 1, 1994

[54] BOTTOM NOZZLE OF A FUEL ASSEMBLY FOR A WATER-COOLED NUCLEAR REACTOR

[75] Inventor: Michel Verdier, Villeurbanne, France

[73] Assignees: Framatome, Courbevoie; Cogema, Velizy Villacoublay, both of France

[21] Appl. No.: 956,171

[22] Filed: Oct. 5, 1992

[30] Foreign Application Priority Data

Oct. 4, 1991 [FR] France ................. 9112242

[51] Int. Cl.[5] .......................... G21C 1/04
[52] U.S. Cl. ..................... 376/352; 376/313; 376/310
[58] Field of Search ............. 376/352, 313, 443, 446, 376/310, 439; 976/DIG. 59, DIG. 264

[56] References Cited

U.S. PATENT DOCUMENTS

| | | | |
|---|---|---|---|
| 4,111,348 | 9/1978 | Laird et al. | 228/181 |
| 4,684,495 | 8/1987 | Wilson et al. | 376/352 |
| 4,828,791 | 5/1989 | DeMario | 376/352 |
| 4,832,905 | 5/1989 | Bryant et al. | 376/352 |
| 5,024,806 | 6/1991 | Cioffi et al. | 376/352 |
| 5,160,697 | 11/1992 | Verdier et al. | 376/352 |

FOREIGN PATENT DOCUMENTS

| | | |
|---|---|---|
| 0289829 | 9/1988 | European Pat. Off. . |
| 0422950 | 4/1991 | European Pat. Off. . |
| 0435744 | 7/1991 | European Pat. Off. . |

*Primary Examiner*—Donald P. Walsh
*Assistant Examiner*—Meena Chelliah
*Attorney, Agent, or Firm*—Pollock, Vande Sande & Priddy

[57] ABSTRACT

The adaptor plate (11) comprises ribs (12) which are substantially perpendicular to its faces, projecting from its lower face, delimiting between them cells and zones (15) into each of which emerges a plurality of through-openings (16) of substantially square cross-section which are arranged in a predetermined pattern.

9 Claims, 3 Drawing Sheets

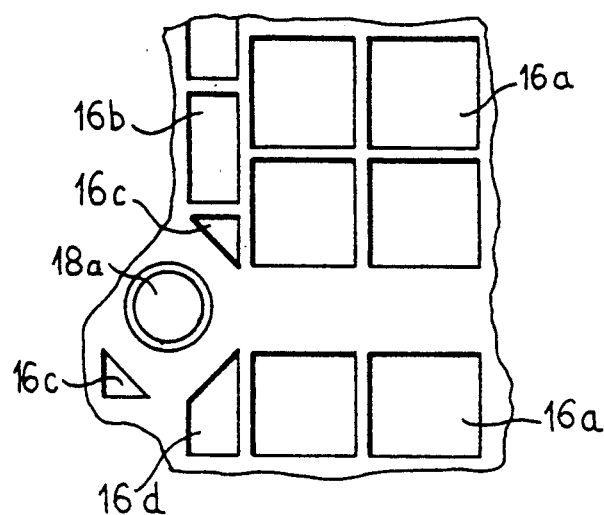
FIG. 2A
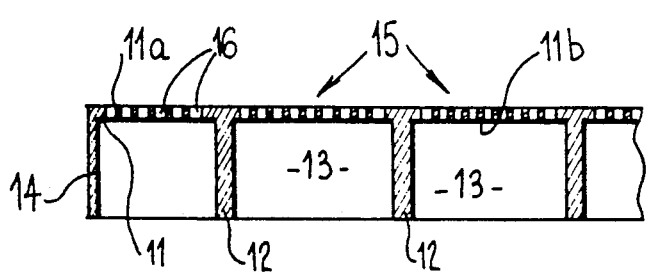
FIG. 3
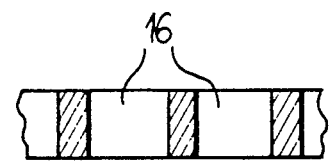
FIG. 3'
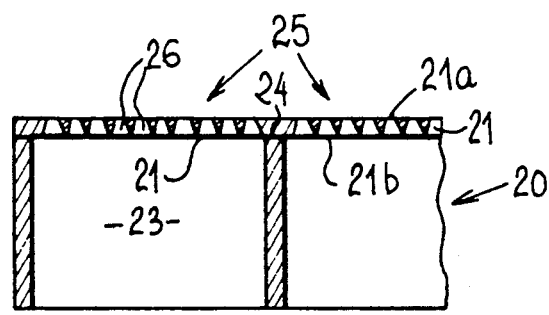
FIG. 3A
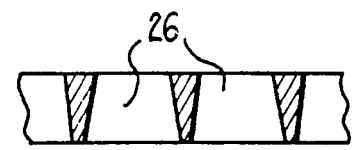
FIG. 3'A

BOTTOM NOZZLE OF A FUEL ASSEMBLY FOR A WATER-COOLED NUCLEAR REACTOR

FIELD OF THE INVENTION

The invention relates to a filtering bottom nozzle of a fuel assembly of a light-water-cooled nuclear reactor and, in particular, of a pressurized water nuclear reactor.

Background of the Invention

Pressurized water nuclear reactors comprise a core consisting of prismatic assemblies disposed side-by-side in a vertical position. The assemblies comprise a framework, consisting of longitudinal guide tubes and spacer grids and closed by nozzles, in which the fuel rods are disposed.

One of the nozzles of the assemblies, called the bottom nozzle, rests on the lower core plate which is perforated with holes at the level of each of the assemblies in order to permit the passage of the cooling water of the reactor through the core, upwards in a vertical direction.

Such a nozzle comprises support legs which rest on the lower core plate and an element positioned transversely relative to the direction of the fuel rods of the bundle, integral with the support legs. This transverse element consists of an adaptor plate comprising an upper face and a lower face which are mutually parallel, in which are fixed the bottom ends of the guide tubes of the assembly and which has openings passing through it permitting the passage and ensuring the distribution of the cooling water of the reactor which circulates in a vertical direction and in contact with the outer surface of the rods of the assembly, after passing through the bottom nozzle.

The adaptor plate of the bottom nozzle contributes to the strength of the framework of the assembly, ensures that the forces exerted on the bottom nozzle are taken up and that the fuel rods are held, and must permit the passage and the distribution of the cooling water of the assembly.

Debris from material may be present in the primary circuit of the reactor and is liable to be entrained by the pressurized water in circulation. If the debris is small (for example, smaller than 10 mm), it can pass through the adaptor plate of the bottom nozzle whose water-passage holes have a diameter generally larger than 10 mm. The debris may become wedged between the fuel rods and the elements holding the rods at the level of the first grid, i.e., of the spacer grid holding the rods in a uniform pattern disposed at the lowest point in the assembly. The debris, which is subjected to axial and transverse hydraulic stresses which are considerable in this zone, can wear away the cladding of the fuel rod. This may result in a loss of leaktightness of the cladding, and an increase in the activity level of the primary system of the reactor.

In order to avoid the entrainment of this debris inside the assembly, it has been proposed to filter the cooling fluid at the level of the adaptor plate of the bottom nozzle by providing the adaptor plate with through-holes whose diameters are sufficiently small to stop debris likely to become wedged in the first grid of the assembly.

The holes of small diameter with circular cross-section are disposed in a square-mesh pattern in the entire cross-section of the adaptor plate. Such a pattern of holes of small diameter generates a considerable pressure drop in the circulation of the cooling fluid passing through the adaptor plate.

An ascending force is created in the assembly due to the circulation of the cooling fluid. The anti-liftoff springs applied on the upper core plate have the task of maintaining a positive resultant of stresses in the direction of the lower core plate in order to prevent liftoff of the fuel assembly.

To achieve this objective and to reduce the stresses to which the anti-liftoff springs are subjected, it is desirable to reduce the hydraulic force being exerted on the fuel assembly. The means consists in increasing the flow passage of the bottom nozzle of the assemble for the cooling fluid.

Moreover, the adaptor plate must have sufficient strength to fulfil the functions of mechanical resistance referred to above. It is thus impossible to increase the density of the holes passing through the adaptor plate beyond a certain limit, unless the thickness of the adaptor plate is increased, which again involves an increase in the pressure drop and a reduction of the space reserved for the clearance of the fuel rods.

SUMMARY OF THE INVENTION

It is an object of the invention to propose a bottom nozzle with reduced pressure drop for a fuel assembly for a water-cooled nuclear reactor, comprising an adaptor plate having a transverse arrangement, comprising an upper face and a lower face which are mutually parallel and which are perforated so as to permit the passage of the cooling water of the assembly and the stopping of debris entrained by the cooling water, this bottom nozzle making it possible to limit, to an extremely low level, the pressure drop in the circulation of the cooling fluid through the nozzle and, thus, the forces exerted on the anti-liftoff springs, while having great strength.

To this end, the adaptor plate comprises ribs providing its mechanical strength which are substantially perpendicular to its faces, projecting from its lower face, delimiting between themselves cells and zones of the lower face of the adaptor plate, into each of which emerges a group of through-openings of substantially square cross-section disposed in a pattern.

Brief Description of the Drawings

In order that the invention may be more clearly understood, description will now be given, by way of example, with reference to accompanying drawings, of a filtering nozzle for a fuel assembly of a pressurized-water nuclear reactor.

FIG. 2A is partial plan view of the nozzle, showing the shape of openings passing through the adaptor plate in the vicinity of a guide tube, in a preferred embodiment.

FIG. 3 is a cross-sectional view along 3—3 in FIG. 2.

FIG. 3' is a detail view on a larger scale of the plate shown in FIG. 3.

FIG. 3A is a cross-sectional view on a larger scale than FIG. 3, showing the longitudinal cross-section of the openings of the adaptor plate, in a variant embodiment of the nozzle.

FIG. 3'A is a detail view on a larger scale of the plate shown in FIG. 3A.

Description of Preferred Embodiment

Figure 1:
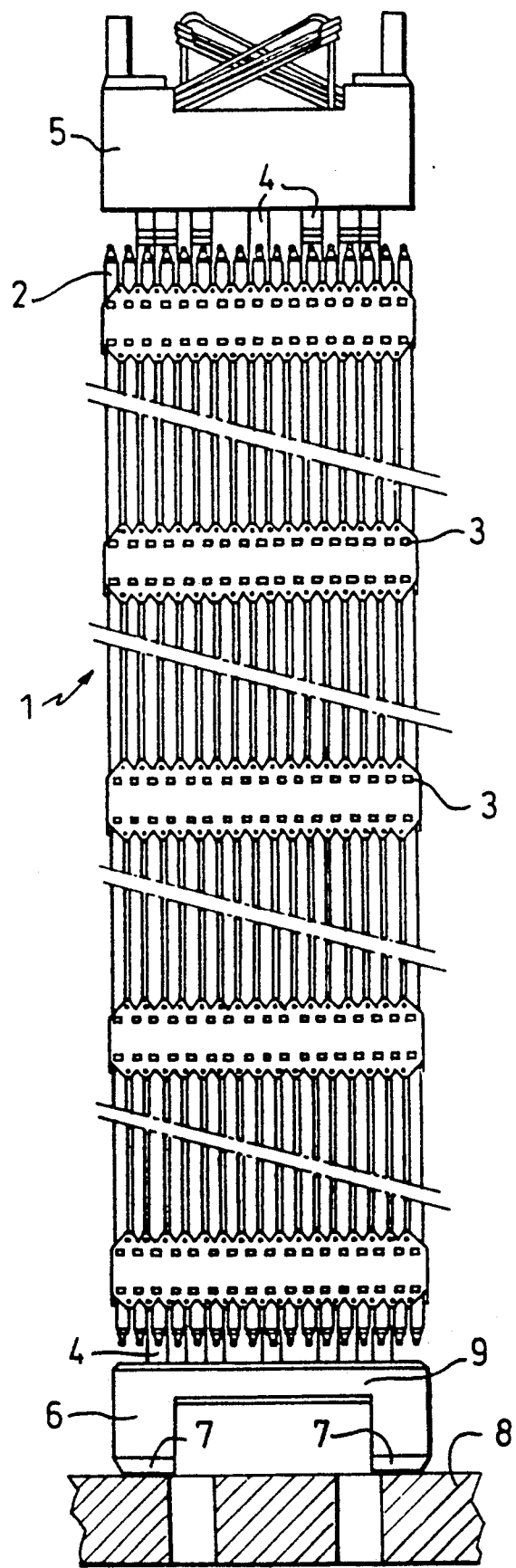
FIG. 1 is a view in elevation of a fuel assembly of a pressurized-water nuclear reactor.

FIG. 1 shows a fuel assembly consisting of a bundle of parallel fuel rods 2 held in a framework consisting of longitudinal guide tubes 4, transverse spacers 3 and end nozzles 5 and 6. The spacers 3 consist of grids whose cells each receive a fuel rod. Certain positions of the pattern of the grids are occupied by guide tubes 4 which are longer than the fuel rods 2. Each of the guide tubes 4 is fixed to the group of spacer grids which are uniformly spaced in the length of the assembly.

The guide tubes are connected, at one of their ends, to a nozzle 5 forming the top nozzle of the assembly and, at their other end, to a second nozzle 6 forming the bottom nozzle.

In its service position, the assembly is placed vertically, as shown in FIG. 1, the bottom nozzle resting, by means of legs 7, on the upper surface of the lower core plate 8 of the nuclear reactor.

The plate 8 is perforated with four water-passage holes emerging below the corresponding bottom nozzle 6, at the level of each of the fuel assemblies forming the core of the reactor.

The support legs 7 are integral, at their upper part, with a transverse support element 9 on which are fixed the lower ends of the guide tubes 4.

The cooling water of the reactor passing through the lower core plate 8 via the openings emerging under the nozzle 6 pass through the transverse element 9 which is perforated with a pattern of openings through its entire thickness.

In this way, the cooling water is caused to circulate upwards in a vertical direction in contact with the fuel rods 2 which it cools and in respect of which it forms a heat exchange.

In arrangements according to the prior art, the transverse element 9 consists of a single plane adaptor plate perforated through its entire thickness by a pattern of openings ensuring the passage of the cooling water at the same time as the filtration and stopping of debris whose size is greater than a certain limit, determined by the openings in question.

The bottom nozzle according to the invention comprises a ribbed adaptor plate whose water-passage and debris-filtration holes are placed in a particular arrangement, as will be described with reference to FIGS. 2, 3 and 3'.

The adaptor plate 11 of the bottom nozzle 10 according to the invention comprises an upper face 11a and a lower face 11b which are plane and mutually parallel, delimiting the plane part of the adaptor plate 11, and a group of reinforcement ribs 12 perpendicular to the faces 11a and 11b of the adaptor plate 11 and projecting relative to the lower face 11b of the adaptor plate.

The whole of the adaptor plate 11 consisting of the plane part delimited by the faces 11a and 11b and the ribs 12 is produced in a single piece, for example by molding and machining of a piece of stainless steel.

The steel or the alloy which is molded will preferably have one of the following compositions:
- A286 steel (Z3CNDTV25-15): C<0.08, Ni 24 to 27, Cr 13.5 to 16, Mo 1.00 to 1.50, Ti 1.90 to 2.35, Al<0.35, U 0.10 to 0.5, Mn<2.00, Si<1.00, the remainder consisting of iron.
- A151-304 steel (Z2CN18-10): C<0.03, Si<1.20, Mo<1.50, Cr 17 to 20, Ni 8 to 12.
- Inconel 718 (NC19FeNb).

The adaptor plate could also be produced from two pieces welded together, as will be described below, with reference to FIG. 3A which relates to a particular embodiment.

The ribs 12 are disposed in a pattern in which most of the meshes are of square or rectangular shape and delimit between themselves and with the lateral walls 14 of the nozzle, cells 13 which are open towards the bottom, i.e., in the direction of the flow of cooling water entering the fuel assembly.

The ribs 12 also delimit zones 15 of the plane part of the adaptor plate 11 which are generally of square or rectangular shape and which occupy the greater part of the surface of the adaptor plate In the zones 15, the plane part of the adaptor plate is perforated with a pattern of through-openings 16 emerging on the lower face 11b of the adaptor plate between the ribs 12 and occupying the entire surface of the zones 15 included between the ribs 12.

The openings 16 are produced by perforating the plane part of the plate 11 between the faces 11a and 11b. The openings 16 are all substantially identical and substantially of square shape and have a dimension such that the diagonal of the squares is substantially equal to or slightly less than the minimum size of the particles entrained by the cooling fluid and which it is desired to retain by means of the nozzle 10, so as to prevent the particles becoming wedged in the space between the rods and the elements for holding the first spacer grid.

The minimum size of this debris and thus the size of the openings 16 is defined by the size of the spaces remaining between the rods and the guide elements of the first spacer grid.

The openings 16 of the adaptor plate are also such that the adaptor plate can hold the fuel rods in the event of slippage or irradiation growth of the rods. The rods then rest on the adaptor plate of the nozzle so that the cooling fluid can still circulate in order to cool the rods.

In a preferred manner, as may be seen in FIG. 2A, in the vicinity of a guide tube 18a, some of the openings 16 may have various shapes in transverse cross-section, so as to adapt to the shape of the cells 13 in the vicinity of the guide tube and to minimize the pressure drop in the circulation of the cooling fluid of the assembly. These openings can, in particular, be of square shape 16a, rectangular shape 16b, triangular shape 16c or trapezoidal 16d. The "flow passage" of the adaptor plate through which the cooling water passes is thus increased.

Inside the cells, the openings 16 generally have a square shape, so that most of the openings 16 passing through the adaptor plate consist of square openings disposed in a square-mesh pattern.

In the case of fuel assemblies for a pressurized-water nuclear reactor of conventional type, the bottom nozzle according to the invention comprises a plane part having a thickness of a few millimetres, for example, of the order of 5 mm. The ribs 12 have a width which is also of the order of a few millimetres, for example 5 mm, a length of a few centimeters, and a height in the direction perpendicular to the plane faces of the adaptor plate of between 15 and 30 mm.

The openings 16 passing through the plane part of the adaptor plate have, for the most part, a square cross-section, a few millimeters in length on each side. The openings disposed in the vicinity of the guide tubes 18 (see FIG. 2A) and along the edges of the cells 13 may have shapes other than the square shape, so as to better match the shape of the cells.

Figure 2:
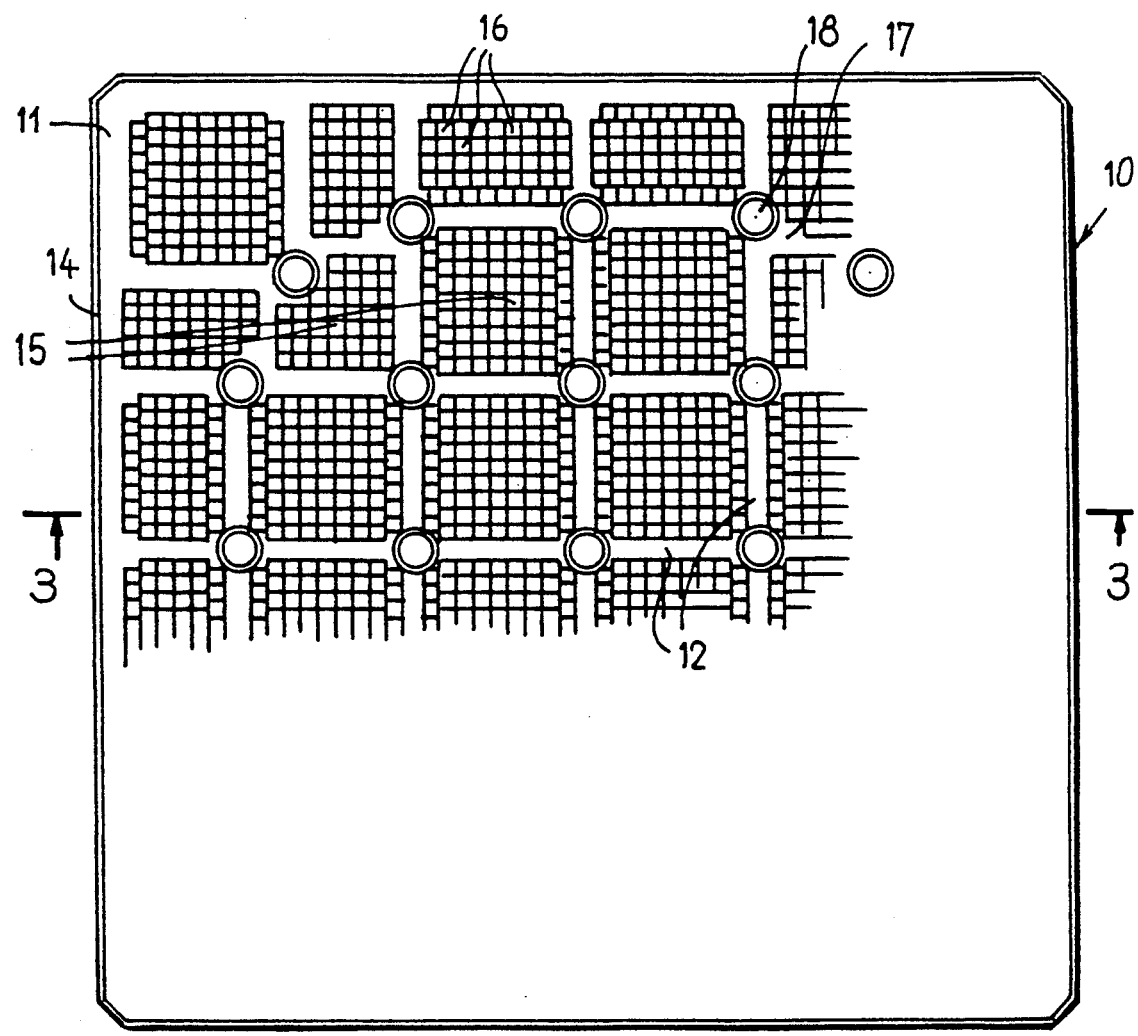
FIG. 2 is a plan view of a filtering bottom nozzle according to the invention.

As can be seen in FIG. 2, the openings 16 are grouped in blocks having the form of groups occupying the zones 15 of the adaptor plate, of square or rectangular shape or of a shape which differs slightly from these simple shapes.

The openings 16 machined in the material of the adaptor plate are separated by thin walls, and are generally produced by perforation of the plate using, for example, an abrasive jet of water at very high pressure (several thousands of bars), this water being charged with abrasive particles (for example, corundum). Such a perforating method and the devices for implementing it are well known. Using a digital-control perforating machine, it is possible to perforate a plate in the pattern as shown in FIG. 2 which comprises several thousands of holes. Such an automated perforating operation can be carried out in a few hours.

It will be obvious that patterns of different shapes could be produced by the same method and that other known methods of perforation, for example using a laser beam, may also be used, without thereby departing from the scope of the present invention.

The ribs 12 are disposed in a pattern in which the position of the nodes corresponds to the position of the guide tubes 18 of the assembly which are fixed inside holes machined in the adaptor plate at the nodes 17 of the pattern of the ribs 12, i.e., in the zones of intersection of these ribs where the metal is relatively thick. The strength and the resistance of the adaptor plate are maintained at a perfectly satisfactory level despite the perforation required for fixing the guide tubes.

The principal role of the ribs 12 is to provide the adaptor plate with sufficient strength, despite the fact that the plane part of the adaptor plate is relatively thin and perforated over a very large part of its surface.

The ribs also guide the cooling fluid of the assembly towards the zones 15 in which the fluid is filtered.

The support legs of the nozzle, by means of which the assembly rests on the lower core plate, are disposed in the corners of the adaptor plate, as in the case of nozzles according to the prior art. These support legs have not been shown in FIGS. 2 and 3.

The square shape of the openings 16 and their arrangement in a pattern and in the form of groups occupying the surface of the zones 15 make it possible to increase the flow passage of the adaptor plate, i.e., the ratio between the total surface area of the openings 16 and the total surface area of the adaptor plate.

Shapes adapted for the openings located in the vicinity of the edges of the cells 13 make it possible to further increase the flow passage.

With an arrangement such as that shown in FIG. 2, it is possible to obtain a flow passage of the order of 50% and thus a pressure drop coefficient which is well below that of the prior art.

It is thus quite obvious that the nozzle according to the invention offers a considerable advantage over a nozzle according to the prior art perforated with circular openings disposed in a single pattern.

The nozzle according to the invention thus offers, at the same time, very good strength, a very high level of mechanical resistance and a large flow passage for the cooling fluid. The large flow passage of the bottom nozzle makes it possible to improve the heat exchange at the level of the fuel rods by means of improved circulation of the cooling fluid, and consequently to improve the efficiency of the nuclear reactor.

As can be seen in FIGS. 3A and 3'A, the nozzle according to the invention may be produced not only in monoblock form by machining a molded piece or a machined thick plate (as in FIGS. 2 and 3), but also by attaching a plane adaptor plate 21 onto a structure 20 consisting of walls 22 delimiting a pattern of cells 23 and by fixing it by welding (for example, using a laser) along weld lines 24. The walls 22 then form the reinforcement ribs of the adaptor plate.

The plane adapter plate 21 and the ribbed structure 20 may be made of different materials, depending on the properties desired.

In this case, perforation of the attached plate 21 is facilitated and the openings 26 of substantially square cross-section, made in each of the cells 25, may be machined so as to have cross-section which diminishes from the lower part of the adaptor plate to its upper face, in order to achieve the size of the straight openings shown in FIGS. 3 and 3'.

These openings with an enlarged cross-section on the lower face of the adaptor plate make it possible to increase the flow passing through the nozzle and to improve the heat exchange without reducing the strength and resistance of the nozzle, while ensuring efficient holding of the rods in the event of slippage.

Zones 15 in which the adaptor plate is perforated may have a pattern of square openings of a shape other than that of the zones which have been shown in FIG. 2. The shape of these zones depends, in particular, on the arrangement of the guide tubes of the assembly. The arrangement shown in FIG. 2 corresponds to a fuel assembly for a pressurized-water nuclear reactor comprising twenty-four guide tubes and an instrumentation tube.

The reinforcement ribs may have a shape and sizes which are different from those which have been described above.

Finally, the invention may apply not only to fuel assemblies for a pressurized-water nuclear reactor, but also to assemblies for other light-water-cooled nuclear reactors.

I claim:

1. Bottom nozzle with reduced pressure drop for a fuel assembly for a water-cooled nuclear reactor, said bottom nozzle comprising a structural part having a transverse arrangement and consisting of a flat part having parallel upper and lower faces and ribs providing mechanical strength to said structural part and disposed substantially perpendicular to said faces, said ribs projecting from said lower face and delimiting between them cells and zones of said lower face into each of which zones emerges a group of openings passing through said flat part so as to permit the passage of cooling water therethrough and stopping of debris entrained by said cooling water under said lower face, said openings being of substantially square cross-section and disposed in a pattern.

2. Nozzle according to claim 1, wherein said ribs are disposed in a square or rectangular-mesh pattern, so that the cells and the zones in which the openings are made has a square or rectangular shape.

3. Nozzle according to claim 2, wherein the pattern of reinforcement ribs comprises nodes at which openings are provided for fixing guide tubes of said fuel assembly.

4. Nozzle according to claim 1, wherein the openings passing through said flat part have at least one of rectangular, triangular and trapezoidal shapes, in the vicinity of the ribs forming the edges of said zones.

5. Nozzle according to any of claims 1 to 4, consisting of a single molded and machined piece made of stainless steel or nickel alloy.

6. Nozzle according to claim 5, made of a material selected from the group consisting of A286 steel (Z3CNDTV25-15), A151-304 steel (Z2CN18-10) and nickel alloy (NC19 FeNb).

7. Nozzle according to any one of claims 1 to 4, consisting of a plane plate forming said flat part perforated with openings and welded to a structure comprising walls delimiting cells and forming the ribs of the structural part.

8. Nozzle according to claim 7, wherein the openings of the plane plate have a cross-section on said lower face of the structural part which diminishes as the openings approach said upper face.

9. Nozzle according to claim 7, wherein the plane plate and the structural part are made of different materials.

* * * * *